United States Patent
Ding et al.

(10) Patent No.: US 6,590,033 B2
(45) Date of Patent: Jul. 8, 2003

(54) CYCLOOLEFIN BLENDS AND METHOD FOR SOLVENT BONDING POLYOLEFINS

(75) Inventors: Yuan-pang Samuel Ding, Libertyville, IL (US); Biran Lal, Lake Zurich, IL (US); Michael T. K. Ling, Vernon Hills, IL (US); Richard Mennenoh, McHenry, IL (US); Daniel Beedon, Elmhurst, IL (US); Leoon Woo, Libertyville, IL (US); Sarah Corbin, Hawthorne Woods, IL (US); George Dillon, Wheeling, IL (US); Dale Pennington, Fox Lake, IL (US); Chuan Qin, Gurnee, IL (US); Patrick Ryan, Crystal Lake, IL (US)

(73) Assignee: Baxter International Inc., Deerfield, IL (US)

( * ) Notice: Subject to any disclaimer, the term of this patent is extended or adjusted under 35 U.S.C. 154(b) by 0 days.

(21) Appl. No.: 09/842,216

(22) Filed: Apr. 25, 2001

(65) Prior Publication Data

US 2002/0055590 A1 May 9, 2002

Related U.S. Application Data

(63) Continuation-in-part of application No. 09/392,912, filed on Sep. 9, 1999, now Pat. No. 6,255,396.

(51) Int. Cl.[7] .............. C08F 8/00; C08L 23/00; C08L 23/04; C08L 45/00
(52) U.S. Cl. ............ 525/191; 525/210; 525/211; 525/232; 525/240; 525/241
(58) Field of Search ............... 525/191, 210, 525/211, 232, 240, 241

(56) References Cited

U.S. PATENT DOCUMENTS

| | | | |
|---|---|---|---|
| 3,494,897 A | 2/1970 | Reding et al. | |
| 4,132,750 A | 1/1979 | Ueshima et al. | |
| 4,573,994 A | 3/1986 | Fischell et al. | 604/891 |
| 4,628,969 A | 12/1986 | Jurgens, Jr. et al. | 141/1 |
| 4,992,511 A | 2/1991 | Yamamoto et al. | 525/97 |
| 5,003,019 A | 3/1991 | Ishimaru et al. | 526/281 |
| 5,008,356 A | 4/1991 | Ishimaru et al. | 526/281 |
| 5,059,487 A * | 10/1991 | Muro et al. | 428/500 |
| 5,087,677 A | 2/1992 | Brekner et al. | 526/160 |
| 5,207,983 A | 5/1993 | Liebert et al. | 422/25 |
| 5,218,049 A | 6/1993 | Yamamoto et al. | 525/97 |
| 5,272,235 A | 12/1993 | Wakatsuru et al. | 526/281 |
| 5,288,560 A | 2/1994 | Sudo et al. | 428/494 |
| 5,331,057 A | 7/1994 | Brekner et al. | 525/298 |
| 5,359,001 A | 10/1994 | Epple et al. | 525/97 |
| 5,422,409 A | 6/1995 | Brekner et al. | 526/281 |
| 5,457,249 A | 10/1995 | Toshihiro et al. | 585/11 |
| 5,475,060 A | 12/1995 | Brekner et al. | 525/289 |
| 5,498,677 A | 3/1996 | Wellner et al. | 526/133 |
| 5,534,606 A | 7/1996 | Bennett et al. | 526/281 |
| 5,552,504 A | 9/1996 | Bennett et al. | 526/348.1 |
| 5,583,192 A | 12/1996 | Bennett et al. | 526/348.1 |
| 5,610,253 A | 3/1997 | Hatke et al. | 526/281 |
| 5,620,425 A | 4/1997 | Heffernan et al. | 604/281 |
| 5,629,398 A | 5/1997 | Okamoto et al. | 526/281 |
| 5,637,100 A | 6/1997 | Sudo | 604/238 |
| 5,637,400 A | 6/1997 | Brekner et al. | 428/137.3 |
| 5,650,471 A | 7/1997 | Abe et al. | 526/160 |
| 5,693,728 A | 12/1997 | Okamoto et al. | 526/115 |
| 5,698,645 A | 12/1997 | Weller et al. | 526/160 |
| 5,723,189 A | 3/1998 | Sudo | 428/36.9 |
| 5,733,991 A | 3/1998 | Rohrmann et al. | 526/160 |
| 5,744,664 A | 4/1998 | Brekner et al. | 585/12 |
| 5,788,670 A | 8/1998 | Reinhard et al. | 604/89 |
| 5,792,824 A | 8/1998 | Natori | 526/309 |
| 5,795,945 A | 8/1998 | Natori | 526/309 |
| 5,854,349 A | 12/1998 | Abe et al. | 525/98 |
| 5,863,986 A | 1/1999 | Herrmann-Schoenherr et al. | 525/63 |
| 5,980,495 A | 11/1999 | Heinz et al. | 604/263 |
| 6,007,520 A | 12/1999 | Sudo | 604/181 |
| 6,065,270 A | 5/2000 | Reinhard et al. | 53/426 |
| 6,068,936 A | 5/2000 | Peiffer et al. | 428/500 |

FOREIGN PATENT DOCUMENTS

| | | |
|---|---|---|
| DE | 251 904 A3 | 12/1987 |
| DE | 393 7865 A1 | 6/1990 |
| EP | 0 133 411 B1 | 1/1979 |
| EP | 0 156 464 A1 | 10/1985 |
| EP | 0 216 509 B1 | 8/1986 |
| EP | 0 283 164 A2 | 3/1988 |
| EP | 0 291 208 A2 | 11/1988 |
| EP | 0411977 A1 | 2/1991 |
| EP | 0 492 982 B1 | 12/1991 |
| EP | 0 497 567 A2 | 1/1992 |
| EP | 0 524 802 A | 7/1992 |
| EP | 0 582 355 B1 | 2/1994 |
| EP | 0 680 401 B1 | 11/1995 |
| EP | 0 430 585 B1 | 1/1996 |
| EP | 0 709 105 A1 | 5/1996 |
| EP | 0 203 799 B1 | 8/1996 |
| EP | 0 384 694 B1 | 9/1996 |
| EP | 0 790 063 A1 | 8/1997 |
| WO | WO 97/08054 | 3/1997 |
| WO | 97/46617 | 12/1997 |
| WO | WO 98/27926 | 7/1998 |

* cited by examiner

Primary Examiner—Nathan M. Nutter
(74) Attorney, Agent, or Firm—Mark J. Buonaiuto; Joseph A. Fuchs

(57) ABSTRACT

The present invention provides a polymer composition having: a first component selected from homopolymers and copolymers of cyclic olefin containing polymers and bridged polycyclic hydrocarbon containing polymers, the first component being present in an amount from about 1–99% by weight of the composition; and a second component is selected from homopolymers and copolymers of a diene having from 4 to 12 carbons, the second component being present in an amount from about 99% to about 1% by weight of the composition.

59 Claims, 3 Drawing Sheets

CYCLOOLEFIN BLENDS AND METHOD FOR SOLVENT BONDING POLYOLEFINS

CROSS-REFERENCE TO RELATED APPLICATIONS

This is a continuation-in-part of U.S. application Ser. No. 09/392,912, filed on Sep. 9, 1999 and now U.S. Pat. No. 6,255,396, which is incorporated herein by reference and made a part hereof.

TECHNICAL FIELD

This invention relates to polymer blends and more particularly to cyclic olefin containing polymers or bridged polycyclic hydrocarbon containing polymers blended with polybutadienes.

BACKGROUND OF THE INVENTION

In the medical field, where beneficial agents are collected, processed and stored in containers, transported and ultimately delivered through drip chambers, tube connectors and tubes by infusion to patients, there has been a recent trend toward developing materials useful for fabricating such containers, tubings and devices without the disadvantages of currently used materials such as polyvinyl chloride. These new materials must have a unique combination of properties to be used in fluid administration sets. Among these are the materials in most instances must be optically clear, environmentally compatible, have sufficient yield strength and flexibility for flexible products and sufficient rigidity for rigid products, have a low quantity of low molecular weight additives, be capable of being solvent bonded to soft polyolefin medical products and be compatible with medical solutions.

It is desirable for medical products in an infusion delivery set to be optically transparent to allow for visual inspection of fluids therein.

It is also desirable that the medical materials be environmentally compatible as a great deal of medical products are disposed of in landfills and through incineration. Further benefits are realized by using a material which is thermoplastically recyclable.

For medical products that are disposed of by incineration, it is necessary to use a material that does not generate or minimizes the formation of by-products such as inorganic acids which may be environmentally harmful, irritating, and corrosive. For example, PVC may generate objectionable amounts of hydrogen chloride (or hydrochloric acid when contacted with water) upon incineration, causing corrosion of the incinerator.

To be compatible with medical solutions, it is desirable that the components of the infusion delivery set be free from or have a minimal content of low molecular weight additives such as plasticizers, stabilizers and the like. In some applications, these components can be extracted into the therapeutic solutions that come into contact with the material. The additives may react with the therapeutic agents or otherwise render the solution ineffective. This is especially troublesome in bio-tech drug formulations where the concentration of the drug is measured in parts per million (ppm), rather than in weight or volume percentages. Even minuscule losses of the bio-tech drug can render the formulation unusable. Because bio-tech formulations can cost several thousand dollars per dose, it is imperative that the dosage not be changed.

Polyvinyl chloride ("PVC") has been widely used to fabricate medical tubings and containers as it meets most of these requirements. However, because PVC by itself is a rigid polymer, low molecular weight components known as plasticizers must be added to render PVC flexible. These plasticizers may leach out of the medical product and into the fluid passing through the products to contaminate the fluid or to render the fluid unusable. For this reason, and because of the difficulties encountered in incinerating PVC, there is a need to replace PVC in at least the fluid contacting portions of the infusion pathway and more preferably in its entirety.

Polyolefins have been developed which meet many of the requirements of medical containers and tubing, without the disadvantages associated with PVC. Polyolefins typically are compatible with medical applications because they have minimal extractability to the fluids and contents which they contact. Most polyolefins are environmentally sound as they do not generate harmful degradants upon incineration, and in most cases are capable of being thermoplastically recycled. Many polyolefins are cost effective materials that may provide an economic alternative to PVC. However, there are many hurdles to overcome to replace all the favorable attributes of PVC with a polyolefin.

For example, because of the inert nature of polyolefins, due in part to the nonpolar nature of the polymer, difficulties have been encountered in bonding the polyolefin materials to rigid housings positioned along the infusion pathway of an infusion set. Typically, medical containers such as I.V. bags are connected to a patient through a series of connected tubing that have in fluid communication drip chambers, Y-type injection sites, venous catheters and the like between the bag and the patient. Many of these components include rigid housings manufactured from polycarbonates, acrylics, ABS, copolyesters and the like. The housings have sleeves in which the tubing is inserted in a telescoping fashion to attach the tube to the housing. Therefore, it is necessary for the medical tubing to be connected to the rigid housing to form a fluid tight seal with the housings.

PVC tubing is typically secured within such housings using solvent bonding techniques. Solvent bonding requires exposing the end of the tubing to be inserted into the housing to a solvent such as cyclohexanone or methyl ethyl ketone. The solvent effectively softens or dissolves the PVC so when the tubing is inserted into the housing, a bond is formed. Solvent bonding techniques, however, are ineffective on certain polyolefins including polyethylene and polypropylene. Problems have also been encountered in using adhesive bonding techniques.

European Patent Application No. 0 556 034 discloses a medical instrument of a material containing a resin of a cyclic olefin compound or a bridged polycyclic hydrocarbon compound. The EP '034 Application discloses making devices such as syringes, injection needles, drip chambers, blood bags and tubing from these resins. While the EP '034 Patent application discloses a non-PVC material for fabricating medical products it does not disclose a method for bonding a rigid housing of a cyclic olefin to a flexible tubing of a cyclic olefin or other polyolefins.

Cycloolefin blends are also well known for providing rigid, injection molded parts. For example, U.S. Pat. No. 5,359,001 discloses a multiple component polymer blend having a first component of a cycloolefin, a second component of a polyolefin and a third component of a cycloolefin block copolymer to compatibilize the cycloolefin and polyolefin. The '001 Patent discloses such blends for impact modifying the highly rigid and brittle cycloolefins. The '001 Patent does not disclose a method for solvent bonding these blends.

U.S. Pat. No. 5,863,986 discloses polymer alloy blends of a cycloolefin copolymers with one or more core-shell particles and one or more block copolymers. Again, these polymer blends are tough on impact and have high flexural strength and elongation at break. The '986 patent does not disclose a method for solvent bonding the polymer alloy blends.

DISCLOSURE OF INVENTION

The present invention provides a polymer composition having: a first component selected from homopolymers and copolymers of cyclic olefin containing polymers and bridged polycyclic hydrocarbon containing polymers, the first component being present in an amount from about 1–99% by weight of the composition; and a second component is selected from homopolymers and copolymers of a diene having from 4 to 12 carbons, the second component being present in an amount from about 99% to about 1% by weight of the composition.

DETAILED DESCRIPTION OF THE INVENTION

Figure 1:
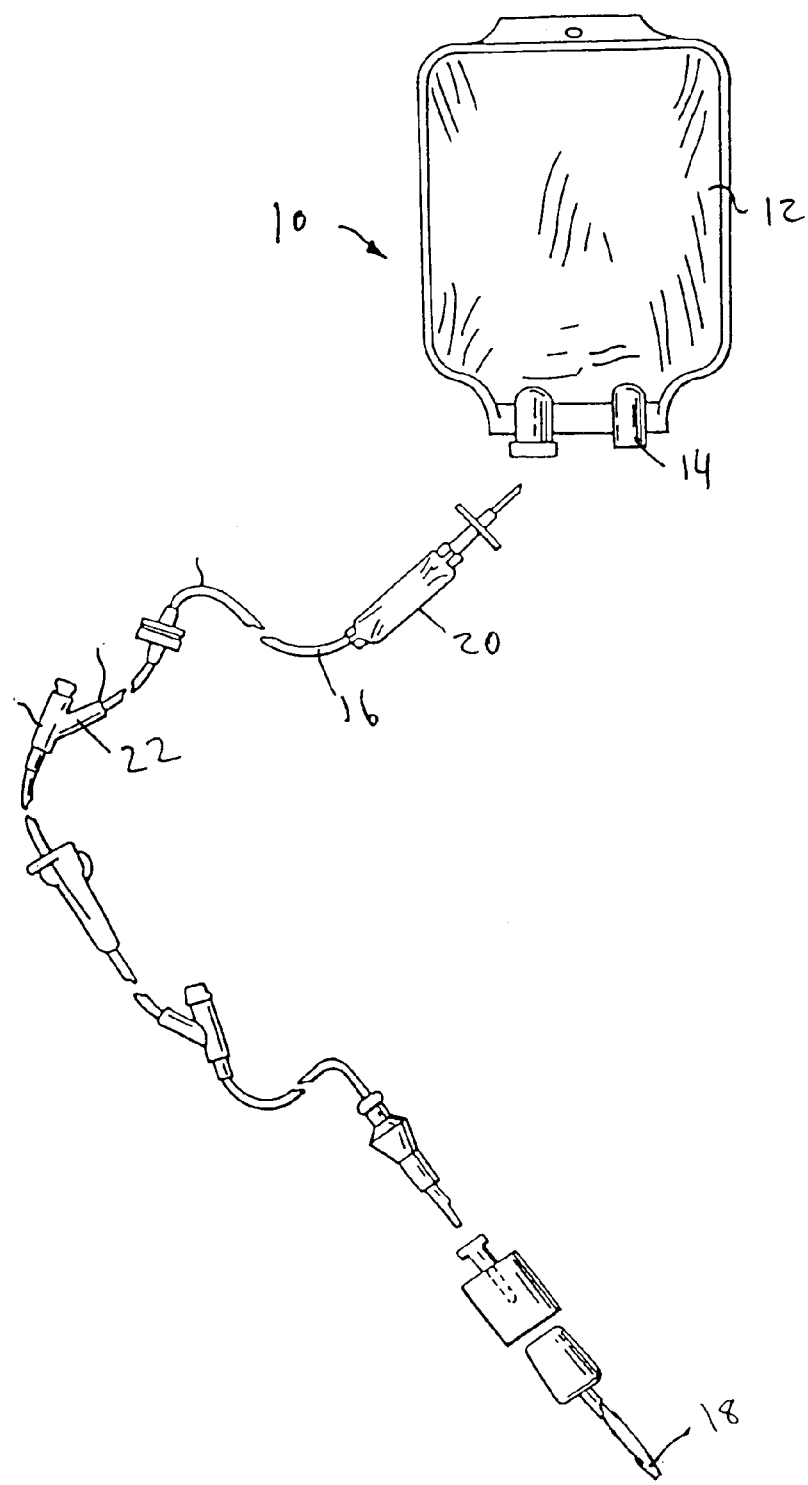
FIG. 1 shows a diagrammatic view of an infusion delivery set.

While the invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
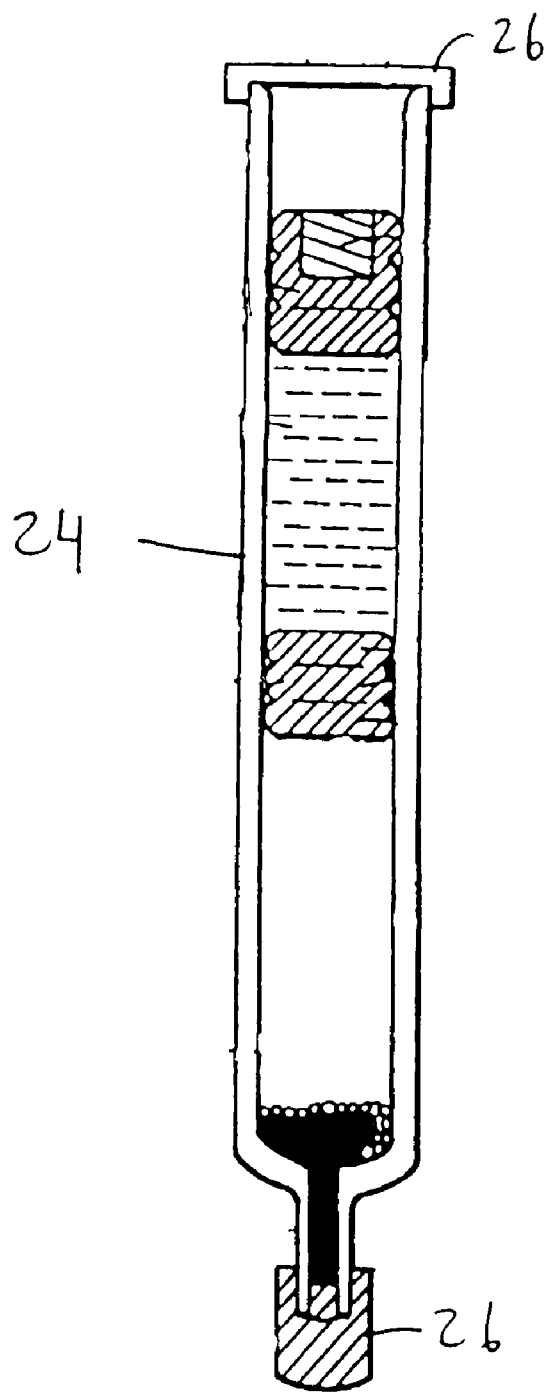
FIG. 2 shows a diagrammatic view of a syringe barrel having end closures solvent bonded thereto.

FIG. 1 shows an infusion delivery set 10 having an I.V. container 12 and port tube 14 connected to a tubing 16 which provides at its distal end a venous catheter 18 for establishing fluid-flow access to a vascular system of a patient. Positioned at intermediate portions of the infusion pathway is a drip chamber 20 and a Y-type injection site 22. It should be understood that other rigid medical housings include filter housings, tubing unions and others well known in the art, and can used in any combination in a delivery set 10. FIG. 2 shows a syringe barrel 24 having end closures 26 solvent bonded on opposite ends of the syringe barrel. Of course the end closure 26 can be on one or both ends of the syringe barrel 24.

As will be described below, the present invention provides polymers and copolymers containing monomers of cyclic olefins (which sometimes shall be referred to as cyclic olefin containing polymers) and blends thereof as well as homopolymers and copolymers containing monomers of bridged polycyclic hydrocarbons (which sometimes shall be referred to as bridged polycyclic hydrocarbon containing polymers) and blends thereof to fabricate both the flexible, rigid and semi-rigid components of the delivery set 10 and further provides solvent bonding and cement bonding techniques for attaching together olefin components to fabricate medical device assemblies and subassemblies contained in an infusion set or other medical devices well known in the medcial arts.

The term polyolefin used herein is meant to include homopolymers and copolymers of ethylene, propylene, butene, pentene, hexene, heptene, octene, nonenene, and decene. Suitable copolymers of ethylene include: (a) ethylene copolymerized with monomers selected from the group of α-olefins having 3–10 carbons, lower alkyl and lower alkene substituted carboxylic acids and ester and anhydride derivatives thereof, (b) ethylene propylene rubbers, (c) EPDM, and (d) ionomers. Preferably, the carboxylic acids have from 3–10 carbons. Such carboxylic acids therefore include acetic acid, acrylic acid and butyric acid. The term "lower alkene" and "lower alkyl" is meant to include a carbon chain having from 3–18 carbons more preferably 3–10 and most preferably 3–8 carbons. Thus, a subset of this group of comonomers includes, as a representative but non-limiting example, vinyl acetates, vinyl acrylates, methyl acrylates, methyl methacrylates, acrylic acids, methacrylic acids, ethyl acrylates, and ethyl acrylic acids.

I. Cyclic Olefins and Bridged Polycyclic Hydrocarbons

Suitable homopolymers and copolymers of cyclic olefins and bridged polycyclic hydrocarbons and blends thereof can be found in U.S. Pat. Nos. 5,218,049, 5,854,349, 5,863,986, 5,795,945, 5,792,824; EP 0 291,208, EP 0 283,164, EP 0 497,567 which are incorporated in their entirety herein by reference and made a part hereof. In a preferred form of the invention these homopolymers, copolymers and polymer blends will have a glass transition temperature of greater than 50° C., more preferably from about 70° C. to about 180° C., a density greater than 0.910 g/cc and more preferably from 0.910 g/cc to about 1.3 g/cc and most preferably from 0.980 g/cc to about 1.3 g/cc and have from at least about 20 mole % of a cyclic aliphatic or a bridged polycyclic in the backbone of the polymer more preferably from about 30–65 mole % and most preferably from about 30–60 mole %.

In a preferred form of the invention, suitable cyclic olefin monomers are monocyclic compounds having from 5 to about 10 carbons in the ring. The cyclic olefins can be selected from the group consisting of substituted and unsubstituted cyclopentene, cyclopentadiene, cyclohexene, cyclohexadiene, cycloheptene, cycloheptadiene, cyclooctene, cyclooctadiene. Suitable substituents include lower alkyl, acrylate derivatives and the like.

In a preferred form of the invention, suitable bridged polycyclic hydrocarbon monomers have two or more rings and more preferably contain at least 7 carbons. The rings can be substituted or unsubstituted. Suitable substitutes include lower alkyl, aryl, aralkyl, vinyl, allyloxy, (meth) acryloxy and the like. The bridged polycyclic hydrocarbons are selected from the group consisting of those disclosed in the above incorporated patents and patent applications. Suitable bridged polycyclic hydrocarbon containing polymers are sold by Ticona under the tradename TOPAS, by Nippon Zeon under the tradename ZEONEX and ZEONOR, by Daikyo Gomu Seiko under the tradeanme CZ resin, and by Mitsui Petrochemical Company under the tradename APEL.

Suitable comonomers include α-olefins having from 3–10 carbons, aromatic hydrocarbons, other cyclic olefins and bridged polycyclic hydrocarbons.

It may also be desirable to have pendant groups associated with the above-mentioned homopolymers and copolymers. The pendant groups are for compatibilizing the cyclic olefin containing polymers and the bridged polycyclic hydrocarbon containing polymers with more polar polymers including amine, amide, imide, ester, carboxylic acid and other polar functional groups. Suitable pendant groups include aromatic hydrocarbons, carbon dioxide, monoethylenically unsaturated hydrocarbons, acrylonitriles, vinyl ethers, vinyl esters, vinylamides, vinyl ketones, vinyl halides, epoxides, cyclic esters and cyclic ethers. The monethylencially unsaturated hydrocarbons include alkyl acrylates, and aryl acrylates. The cyclic ester includes maleic anhydride.

II. Blends Containing Cyclic Olefin Containing Polymers and/or Bridged Polycyclic Hydrocarbon Containing Polymers Suitable two-component blends of the present invention include as a first component the homopolymers and copolymers of the cyclic olefin containing polymers and the bridged polycyclic hydrocarbon containing polymers (collectively hereinafter sometimes referred to as "COCs") described above in Section I. The COCs should be present in an amount from about 1–99% by weight of the blend, more preferably from about 30–99%, and most preferably from about 35–99 weight percent or any combination or subcombination of ranges therein. In a preferred form of the invention the first components has a glass transition temperature of from about 70° C. to about 130° C. and more preferably from about 70–110° C.

The blends further include a second component in an amount by weight of the blend of from about 99–1%, more preferably from about 70–1% and most preferably from about 65–1%. The second component is selected from the group consisting of homopolymers and copolymers of ethylene, propylene, butene, hexene, octene, nonene, decene and styrene. The second component preferably has a density of from about 0.870–0.960 g/cc and more preferably from about 0.910–0.960 g/cc and more preferably from about 0.930–0.960 g/cc. In a preferred form of the invention the second component is an ethylene and α-olefin copolymer where the α-olefin has from 3–10 carbons, more preferably from 4–8 carbons and most preferably 6 carbons. Most preferably the ethylene and α-olefin copolymers are obtained using a metallocene catalyst. Suitable catalyst systems, among others, are those disclosed in U.S. Pat. Nos. 5,783,638 and 5,272,236. Suitable ethylene and α-olefin copolymers include those sold by Dow Chemical Company under the AFFINITY and ENGAGE tradenames, those sold by Exxon under the EXACT tradename and those sold by Phillips Chemical Company under the tradename MARLEX.

In another preferred form of the invention, the second component is selected from the group consisting of homopolymers and copolymers of dienes having from 4 to 12 carbons and more preferably from 4 to 8 carbons and most preferably 4 carbons. Accordingly, the dienes include butadiene, pentadiene, hexadiene, heptadiene, octadiene, nonadiene, decadiene, etc.

In a more preferred form of the invention the second component is a polybutadiene homopolymer. The polybutadiene homopolymers of primary interest are defined by the 1,2- and 1,4-addition products (both cis and trans) of 1,3-butadiene (these shall collectively be referred to as polybutadienes). In a more preferred form of the invention the second component is a 1,2-addition product of 1,3 butadiene (these shall be referred to as 1,2 polybutadienes). In an even more preferred form of the invention the polymer of interest is a syndiotactic 1,2-polybutadiene and even more preferably a low crystallinity, syndiotactic 1,2 polybutadiene. Suitable resins include those sold by JSR (Japan Synthetic Rubber) under the grade designations: JSR RB 810, JSR RB 820, and JSR RB 830.

The polybutadiene is present in an amount by weight of the blend from about 99% to about 1%. For flexible applications the second component will be present in an amount by weight from about 99% to about 51%. For rigid applications the second component will be present in an amount from about 50% to about 1%.

Suitable three-component blends include as a third component a COC selected from those COCs described in Part I above and different from the first component. In a preferred form of the invention the second COC will have a glass transition temperature of higher than about 120° C. when the first COC has a glass transition temperature lower than about 120° C. In a preferred form of the invention, the third component is present from about 10–90% by weight of the blend and the first and second components should be present in a ratio of from about 2:1 to about 1:2 respectively of the first component to the second component.

III. Medical Products

Medical devices such as those shown in FIG. 1 may be fabricated from the COCs set forth above. The present invention provides for fabricating, rigid, semi-rigid and flexible devices from the COCs. What is meant by the use of the term "rigid" herein is parts having a modulus of elasticity of at least 150,000 psi when measured in accordance with ASTM D790. What is meant by the term "semi-rigid" is parts having a modulus of elasticity of greater than 20,000 psi but less than 150,000 psi when measured in accordance with ASTM D790. What is meant by the term "flexible" is articles having a modulus of elasticity of less than about 20,000 psi when measured in accordance with ASTM D790.

Rigid parts such as Y-sites, filter housings, injection sites, spikes, syringe barrels, closures and others may be fabricated from the COCs by injection molding, blow molding, thermoforming processes or other plastic fabricating techniques. Semi-rigid parts such as drip chambers and closures may be fabricated from injection molding, blow molding, thermoforming and extrusion processes. Flexible parts such as medical tubing, closures and medical containers may be obtained using extrusion, coextrusion, lamination, blow molding and injection molding processes.

For flexible and semi-rigid components such as tubing, containers and drip chamber 20, suitable polymers also include other polyolefins such as ethylene vinyl acetate copolymers having a vinyl acetate content of from about 5% to about 32%, ethylene methacrylate copolymers, ethylene and α-olefin copolymers having a density of less than 0.910 g/cc, flexible polypropylenes such as Huntsman's REFLEX and Montell's ADFLEX and stereo block homopolymers of polypropylene disclosed in U.S. Pat. No. 5,594,080. Suitable polymers also include polymer blends and films such as those disclosed in U.S. Pat. No. 5,849,843 and U.S. Pat. No. 5,998,019.

Figure 3:
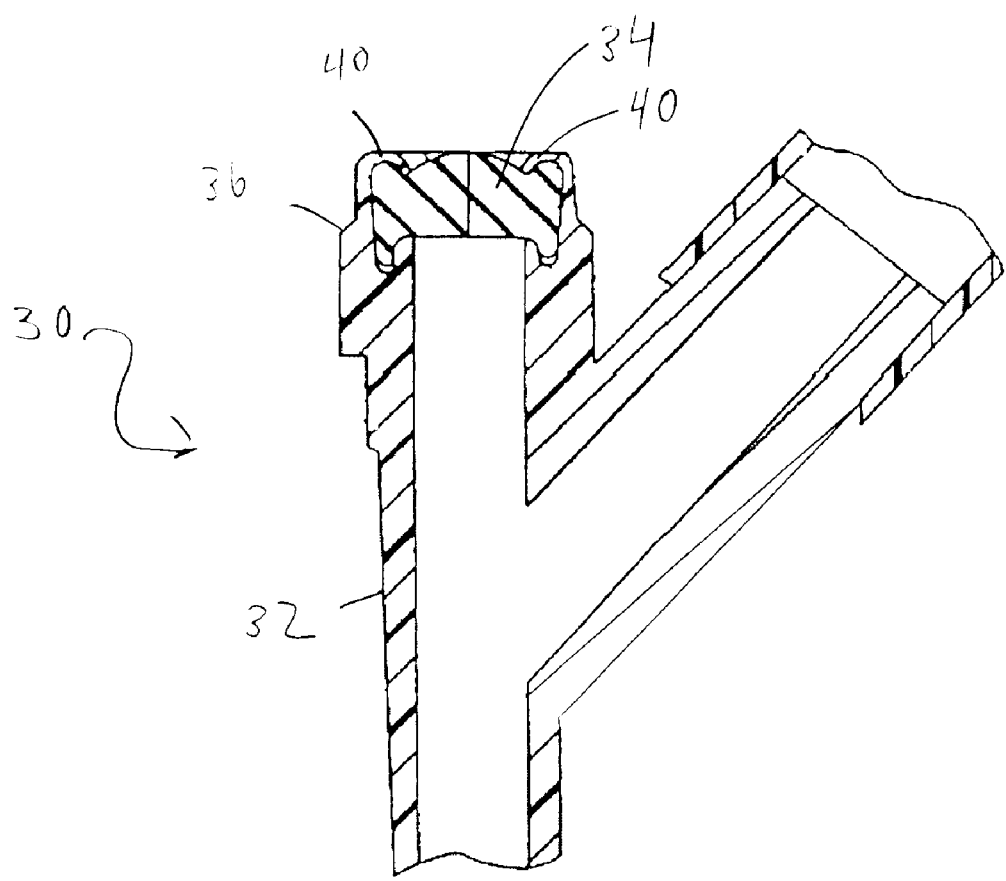
FIG. 3 shows a perspective view of a Y-type injection site

FIG. 3 shows a Y-type injection site. The injection site 30 has a rigid housing 32 containing a septum 34 at one end 36 of two legs of the Y. The septum 34 is held in place by swaged ends 40 of the rigid housing. The process of swaging is more fully set forth in U.S. Pat. No. 5,658,260 (See FIGS. 20–28 and accompanying text) which is incorporated in its entirety herein by reference and made a part hereof.

IV. Polymer Blending

Blends of the components set forth in the following table were prepared with a Brabender mixer at 250° C. at 50 rpm for 4 minutes. Films were prepared by compression molding at 450° F. to a thickness about 0.4 mm. The haze property is useful for the end user to see through the medical device for the purpose of examining the liquid level, particulates, contamination, or the presence of drugs. Lower haze gives clearer view and higher haze gives a fuzzy view. Low haze is frequently a desirable property for medical devices such as solution containers, drug delivery devices, I.V. and blood sets, dialysis devices, and syringes. The haze and total light transmittance of the film were measured using a ColorQuest instrument with both sides of the film wetted with isopropyl alcohol to remove or minimize the effect of surface roughness.

V. Method of Solvent Bonding COCs

The present invention provides a method for assembling components of an infusion set into medical assemblies using solvent bonding techniques. Solvent bonding techniques can be used to join together any combination of rigid, semi-rigid and flexible parts including joining two rigid components, a rigid component to a semi-rigid component, a rigid component to a flexible component, a semi-rigid component to a flexible component, a semi-rigid component to another semi-rigid component, and certain flexible components to one another.

The method of solvent bonding includes the steps of: (1) providing a first article of a polymer composition described above in Sections I and II such as those having a first component of cyclic olefin containing polymer or a bridged polycyclic hydrocarbon containing polymer, the first component being present in an amount from about 30% to about 100% by weight of the composition; (2) providing a second article of a material selected from the group comprising low crystallinity polymers; (3) applying a solvent to one of the first article or the second article to define an interface area; and (4) bonding the first article to the second article along the interface area. Suitable low crystallinity polymers to fabricate the second article include COCs, COC blends having minimally 30% COC by weight, polymethyl pentene, polyolefins having a modulus of elasticity of less than 10,000 psi when measured in accordance with ASTM D790, and styrene containing polymers without modulus limitations.

Suitable solvents are those having a solubility parameter of less than about 20 $(MPa)^{1/3}$, more preferably less than about 19 $(MPa)^{1/2}$ and most preferably less than about 18 $(MPa)^{1/2}$ and include, but are not limited to, aliphatic hydrocarbons, aromatic hydrocarbons, mixtures of aliphatic hydrocarbons, mixtures of aromatic hydrocarbons and mixtures of aromatic and aliphatic hydrocarbons. Suitable aliphatic hydrocarbons include substituted and unsubstituted hexane, heptane, cyclohexane, cycloheptane, decalin, and the like. Suitable aromatic hydrocarbons include substituted and unsubstituted aromatic hydrocarbon solvents such as xylene, tetralin, toluene, and cumene. Suitable hydrocarbon substituents include aliphatic substituents having from 1–12 carbons and include propyl, ethyl, butyl, hexyl, tertiary butyl, isobutyl and combinations of the same. What is meant by the terms "aliphatic hydrocarbon" and "aromatic hydrocarbon" is a compound containing only carbon and hydrogen atoms. Suitable solvents will also have a molecular weight less than about 200 g/mole, more preferably less than about 180 g/mole and most preferably less than about 140 g/mole.

The first article can be rigid, semi-rigid and flexible medical product selected from the group consisting of Y-sites, filter housings, drip chambers, heparin locks, injection sites, catheters, spikes, syringe barrels, closures, tubings, oxygenators, pump casettes, valves, burretes, and any medical article or component. The second article can be rigid, semi-rigid and flexible polymeric material selected from the group comprising polyolefins, styrene containing polymers, cyclic olefin containing polymers and bridged polycyclic hydrocarbon containing polymers. The second article can be of the same device set forth for the first article.

In a preferred form of the invention, the method comprises the steps of: (1) providing a first article of a polymer composition comprising: (a) a first component obtained by polymerizing a norbornene monomer and an ethylene monomer, the norbornene monomer being present in an amount of at least about 20 mole percent of the copolymer, the first component being present in an amount from about 30% to about 100% by weight of the composition; and (b) a second component of a first ethylene and α-olefin copolymer, the second component being in an amount from about 70% to about 0% by weight of the composition; (2) providing a second article of low crystallinity polymers; (3) applying a solvent to one of the first article or the second article to define an interface area; and (4) bonding the first article to the second article along the interface area.

In another preferred form of the invention, the method comprises the steps of: (1) providing a first article of a polymer composition comprising: (a) a first component obtained by polymerizing a norbornene monomer and an ethylene monomer, the norbornene monomer being present in an amount of at least about 20 mole percent of the copolymer, the first component being present in an amount from about 1% to about 99% (or from about 99% to about 51% or from about 50% to about 1%) by weight of the composition; and (b) a second component of a homopolymer or copolymer of a diene having from 4 to 12 carbons (more preferably one of the polybutadiene polymers discussed in detail above), the second component being present in an amount from about 99% to about 1% by weight of the composition (or from about 1% to about 49% or from about 50% to about 99%); (2) providing a second article of low crystallinity polymers; (3) applying a solvent to one of the first article or the second article to define an interface area; and (4) bonding the first article to the second article along the interface area.

VI. COC Cement

For those flexible polymers that do not bond well to other flexible polymers using the solvent bonding techniques described above in Section IV, the present invention provides a cyclic olefin containing polymer based cement composition or bridged polycyclic hydrocarbon containing polymer based cement composition. The first component of the cement composition is selected from those set forth in Section I above and include a homopolymer or copolymer of a cyclic olefin or a bridged polycyclic hydrocarbon in an amount from 1–20% by weight of the composition, more preferably from 1–15% and most preferably from 3–10%, and a second component of a solvent having a solubility parameter of less than about 20 $(Mpa)^{1/2}$ more preferably less than about 19 $(Mpa)^{1/2}$ and most preferably less than about 18 $(MPa)^{1/2}$ and more preferably selected from the group of aliphatic hydrocarbons and aromatic hydrocarbons set forth above in Section IV. Suitable solvents will also have a molecular weight less than about 200 g/mole, more preferably less than about 180 g/mole and most preferably less than about 140 g/mole.

These cement compositions can also be used for bonding flexible articles to rigid articles, flexible articles to semi-rigid articles, semi-rigid articles to one another or for bonding semi-rigid articles to rigid articles or for bonding rigid articles to one another. Accordingly, the cement compositions can be used to prepare medical device assemblies such as joining flexible tubings to one another, joining flexible tubings to tubing unions and flexible tubings to drip chambers, flexible tubings to Y-sites and other rigid housings or any of the components of the medical infusion set or other medical device assemblies.

It may also be desirable to include in the cement composition polymer resins from the articles being joined. These optional components can be added in an amount by weight of the composition from 0–10%, more preferably from 0.2–5% and most preferably from 0.2–3%. The third component can be selected from the group comprising polyethylene copolymers having a density less than 0.880 g/cc, polymethyl pentene, polypropylene having a modulus of less than 10,000 psi and more preferably less than 4,000 psi, and certain styrene containing copolymers and interpolymers. Typically these flexible type polypropylenes are atactic. Certain polypropylene copolymers with ethylene are also suitable. Suitable styrene containing polymers include Dow's interpolymer of styrene sold under the tradename INDEX. Other suitable styrene containing polymers include SBS, SIS and hydrogenated derivatives thereof such as SEBS and SEPS.

The method of using a polymeric cement to assemble medical devices comprises the steps of: (1) providing a first article of a low crystallinity polymer set forth above; (2) providing a second article of a low crystallinity polymer set forth above; (3) providing a cement composition having a first component of a cyclic olefin containing polymer or a bridged polycyclic hydrocarbon containing polymer and a second component of an effective amount of a solvent having a solubility parameter of less than about 20 $(MPa)^{1/2}$ and more preferably selected from the group of aliphatic hydrocarbons and aromatic hydrocarbons having a molecular weight less than about 200 g/mole; (4) applying the cement composition to one of the first and second articles to define a bonding area; and (5) attaching the first article to the second article along the bonding area to fixedly attach the first article to the second article.

Suitable polyolefins for the first and second articles can be selected from the group comprising homopolymers and copolymers of ethylene, propylene, butene, pentene, hexene, heptene, octene, nonenene, and decene. Suitable copolymers of ethylene include: (a) ethylene copolymerized with monomers selected from the group of α-olefins having 3–10 carbons, lower alkyl and lower alkene substituted carboxylic acids and ester and anhydride derivatives thereof, (b) ethylene-propylene rubbers, (c) EPDM, and (d) ionomers. Preferably, the carboxylic acids have from 3–10 carbons. Such carboxylic acids therefore include acetic acid, acrylic acid and butyric acid. The term "lower alkene" and "lower alkyl" is meant to include a carbon chain having from 3–18 carbons more preferably 3–10 and most preferably 3–8 carbons. Thus, a subset of this group of comonomers includes, as a representative but non-limiting example, vinyl acetates, vinyl acrylates, methacrylates, methyl methacrylates, acrylic acids, methyl acrylic acids, ethyl acrylates, and ethyl acyrlic acids.

The first component of the cement composition can also be a copolymer of the cyclic olefins or the bridged polycyclic hydrocarbons set forth above in Section I. Suitable comonomers of the COCs can be selected from the group comprising α-olefins having from 2–10 carbons, aromatic hydrocarbons, cyclic hydrocarbons, and bridged polcyclic hydrocarbons. In a preferred form of the invention the first component is a copolymer of a norbornene monomer and an ethylene monomer and more preferably the norbornene monomer is present in at least about 20 mole percent of the copolymer and even more preferably the norbornene is present from about 30 to about 60 mole percent.

The cement composition can also have an additional optional component selected from the group of polyethylene copolymers having a density less than about 0.880 g/cc, polymethyl pentene, polypropylene having a modulus of less than about 10,000 psi and more preferably less than about 4,000 psi, and certain styrene containing copolymers and interpolymers. Typically these flexible type polypropylenes are atactic. Certain polypropylene copolymers with ethylene are also suitable. Suitable styrene and ethylene containing polymers include Dow's interpolymer of styrene sold under the tradename INDEX. Other suitable styrene containing polymers include SBS, SIS and hydrogenated derivatives thereof such as SEBS and SEPS.

In a preferred form of the invention, the method for using a polymeric cement to assemble medical devices comprises the steps of: (1) providing a first article of a low crystallinity polymer set forth above; (2) providing a second article of a low crystallinity polymer set forth above; (3) providing a cement composition comprising: (a) a first component in an amount by weight of from 1–20% of the cement composition and obtained by copolymerizing a norbornene monomer and an ethylene monomer, the norbornene monomer being present in an amount of at least about 20 mole percent of the copolymer; (b) a second component of a solvent in an amount by weight from about 99% to about 80% of the cement composition; and (c) an optional third component in an amount by weight from about 0–10% by weight of the cement composition and selected from the group of optional components set forth above; (4) applying the cement composition to one of the first and second articles to define a bonding area; and (5) attaching the first article to the second article along the bonding area to fixedly attach the first article to the second article.

The present invention also provides a medical device assembly. The assembly has a first article of a first polymeric material selected from the group comprising polyolefins, styrene containing polymers, cyclic olefin containing polymers and bridged polycyclic hydrocarbon containing polymers. The assembly also has a second article of a polymeric material selected from the group comprising polyolefins, styrene containing polymers, cyclic olefin containing polymers and bridged polycyclic hydrocarbon containing polymers. The first article is attached to the second article with a cement composition. The cement composition has a first component of a cyclic olefin containing polymer or a bridged polycyclic hydrocarbon containing polymer and an effective amount of a solvent having a solubility parameter of less than about 20 $(MPa)^{1/2}$ and more preferably selected from the group of aliphatic hydrocarbons and aromatic hydrocarbons having a molecular weight less than about 200 g/mole. The following are non-limiting examples of the present invention.

EXAMPLES

Example I

Test methods for resin properties:

Tensile Modulus: ASTM D638.
Flexural Modulus: ASTM D790.
Glass Transition Temperature: DSC.
Light Transmittance: ASTM D1003.

Example II

Resin Properties:

Topas resins are produced by Ticona, a member of the Hoechst Group.
CZ Resin is marketed by the Diakyo Gomu Seiko and The West Company.
Zeonex resin is produced by Nippon Zeon Co., Ltd.

| Resin | Glass Transition Tg. (° C.) | Tensile Modulus (kpsi) | Light Transmittance (%) |
|---|---|---|---|
| Topas 8007 | 85 | 377 | 92 |
| Topas 6013 | 130 | 464 | 92 |
| Topas 6015 | 160 | 464 | 92 |
| Topas 6017 | 180 | 464 | 92 |
| CZ Resin | 140 | 341 | 91 |
| Zeonex 280 | 140 | 341 | 91 |

(1) Non-COC Resins:

| Material | Tensile/Flexural Modulus (kpsi) | Density (g/cc) | Comonomer |
|---|---|---|---|
| Polyethylene: | | | |
| Dow Chemicals Affinity VP8770 | 5 | 0.885 | Octene |
| Dow Chemicals Affinity PL1880 | 12 | 0.903 | Octene |
| Du Pont Dow Engage 8003 | 5 | 0.885 | Octene |
| Du Pont Dow Engage 8411 | 3 | 0.880 | Octene |
| Dow Chemicals Dowlex 2045 | 38 | 0.920 | Octene |
| Mitsui Tafmer A4085 | 5 | 0.885 | Butene |
| Exxon Exact 3024 | 14 | 0.905 | Butene |
| Exxon Exact 3128 | 12 | 0.900 | Butene |
| Exxon Exact 4033 | 3 | 0.880 | Butene |
| Exxon Exact 3030 | 14 | 0.905 | Hexene |
| Exxon Exact 3131 | 11 | 0.900 | Hexene |
| Phillips Marlex mPACT D143 | 23 | 0.916 | Hexene |
| Phillips Marlex mPACT D350 | 64 | 0.933 | Hexene |
| Polypropylene: | | | |
| Huntsman Rexflex W304 | 2 | 0.88 | |
| Huntsman Rexflex W210 | 4 | 0.89 | |
| EVA | | | |
| Du Pont Elvax CM576 | 2.5 | 0.95 | |
| Polybutene | | | |
| Montell PB0200 | 35 | 0.915 | |
| Montell PB8340 | 32 | 0.908 | |
| Styrenic copolymer | | | |
| Phillips K-Resin KR03 | 210 | 1.01 | |
| Shell Kraton G 1657 | 0.4 | 0.90 | |

(1) Solvents used in the examples:

All solvents were purchased from the Sigma-Aldrich Co. The solubility parameters reported below are the Hansen Solubility Parameters at 25 degree C., as listed in the Polymer Handbook, 3$^{rd}$ Ed., Chapter VII, Pages 540–544 unless otherwise specified.

| Solvent | Solubility Parameter (Mpa)$^{1/2}$ | Molecular Weight (g/mol) | Type of Compound |
|---|---|---|---|
| Cyclohexane | 16.8 | 84 | Aliphatic hydrocarbon |
| Methyl cyclohexane | 16.0 | 98 | Aliphatic hydrocarbon |
| Ethyl cyclohexane | 16.3* | 112 | Aliphatic hydrocarbon |
| Propyl cyclohexane | 16.2 | 126 | Aliphatic hydrocarbon |
| n-Butyl cyclohexane | 16.2* | 140 | Aliphatic hydrocarbon |
| t-Butyl cyclohexane | — | 140 | Aliphatic hydrocarbon |
| Decalin | 18.0–18.8 | 138 | Aliphatic hydrocarbon |
| Heptane | 15.3 | 100 | Aliphatic hydrocarbon |
| Xylene | 18.0 | 106 | Aromatic |
| Tetralin | 20.0 | 132 | Aromatic |
| Cumene | 17.6* | 120 | Aromatic hydrocarbon |
| Toluene | 18.2 | 92 | Aromatic hydrocarbon |
| Cyclohexanone | 19.6 | 98 | Ketone |
| Methyl ethyl ketone | 19.0 | 72 | Ketone |
| Methylene chloride | 20.3 | 85 | Halohydrocarbon |
| Tetrahydrofuran | 19.4 | 72 | Ether |
| Dimethyl formamide | 24.8 | 73 | Nitrogen containing compound |
| Dimethyl sulfoxide | 26.6 | 78 | Sulfur containing compound |

*Data from CRC Handbook of Solubility Parameters and Other Cohesion Parameters, 2$^{nd}$ Ed.

Example III

Test articles and solvent bonding test results:

All the COC blends set forth in the table below were prepared using a Brabender mixer, mixed at 250° C. at 50 rpm for about 4 minutes, and then compression molded into 0.010" to 0.025" thick sheets at 450° F.

| COC Blend Composition | Blend Ratio (wt %) | Material Rigidity | Strength of Solvent Bonding[1] to ULDPE[2] (flexible) | to EVA[3] (flexible) | to COC[3] (rigid) |
|---|---|---|---|---|---|
| Topas 8007/Tafmer A4085 | 0/100 | flexible | none | none | good |
| | 30/70 | semi-rigid | weak | weak | good |
| | 50/50 | rigid | good | good | strong |
| | 70/30 | rigid | strong | strong | strong |
| Topas 8007/Affinity VP8770 | 0/100 | flexible | none | none | good |
| | 50/50 | rigid | good | good | strong |
| Topas 8007/Affinity PL1880 | 0/100 | flexible | none | none | weak |
| | 50/50 | rigid | good | good | strong |
| Topas 8007/Engage 8411 | 0/100 | flexible | none | none | good |
| | 50/50 | rigid | good | good | strong |
| Topas 8007/Exact 3024 | 0/100 | flexible | none | none | weak |
| | 50/50 | rigid | good | good | strong |
| | 70/30 | rigid | strong | strong | strong |
| Topas 8007/Exact 3128 | 0/100 | flexible | none | none | weak |
| | 50/50 | rigid | good | good | strong |
| Topas 8007/Exact 4033 | 0/100 | flexible | none | none | good |
| | 50/50 | rigid | good | good | strong |
| Topas 8007/Engage 8003 | 30/70 | semi-rigid | weak | | |
| | 40/60 | rigid | good | | |
| | 50/50 | rigid | good | | |
| | 60/40 | rigid | strong | | |
| | 70/30 | rigid | strong | | |
| | 80/20 | rigid | strong | | |
| | 90/10 | rigid | strong | | |
| Topas 6017/Dowlex 2045 | 0/100 | semi-rigid | none | none | none |
| | 50/50 | rigid | good | good | strong |

-continued

| COC Blend Composition | Blend Ratio (wt %) | Material Rigidity | Strength of Solvent Bonding[1] | | |
|---|---|---|---|---|---|
| | | | to ULDPE[2] (flexible) | to EVA[3] (flexible) | to COC[3] (rigid) |
| Topas 6015/Tafmer A4085 | 30/70 | rigid | weak | weak | good |
| | 50/50 | rigid | good | good | strong |
| | 70/30 | rigid | good | good | strong |
| Topas 8007/Rexflex W304 | 0/100 | flexible | none | none | good |
| | 30/70 | semi-rigid | weak | weak | good |
| | 50/50 | rigid | good | good | strong |
| | 70/30 | rigid | strong | strong | strong |
| Topas 8007/PB0200 | 0/100 | semi-rigid | none | none | none |
| | 50/50 | rigid | good | good | strong |
| Topas 8007/PB8340 | 0/100 | semi-rigid | none | none | none |
| | 50/50 | rigid | good | good | strong |
| Topas 6015/PB0200 | 50/50 | rigid | good | good | strong |
| Topas 6015/PB8340 | 50/50 | rigid | good | good | strong |
| Topas 8007/Kraton G1657 | 0/100 | flexible | none | none | good |
| | 30/70 | semi-rigid | weak | weak | good |
| | 50/50 | rigid | good | good | strong |
| | 70/30 | rigid | good | good | strong |
| Topas 8007/K-Resin KR01 | 0/100 | rigid | none | none | weak |
| | 50/50 | rigid | good | good | strong |
| Topas 6015/K-Resin KR01 | 50/50 | rigid | good | good | strong |
| Topas 6015/Tafmer 14085/Kraton G1657 | 60/20/20 | rigid | good | good | strong |
| Topas 6017/Topas 8007/Affinity VP8770 | 25/25/50 | rigid | good | good | strong |
| | 30/20/50 | rigid | good | good | strong |

[1]The solvent used is cyclohexane.
Bond strength was assessed by hand pull test, at one day after the solvent bonding.
Ratings:
None = Readily separable.
Weak = Some bond strength but easy to separate.
Good = Hard to separate, no material transfer is visible on the peeled surface but is suitabe for providing a sterile, sturdy connection.
Strong = Very hard to separate, material transferring from one surface to another at the peeling bonding interface is visible.
[2]The ULDPE specimen was made from Dow Chemicals Engage 8003 resin and was extruded into a tube.
[3]The EVA specimen was made from DuPont Elvax CM576 resin which had 28% VA content, and was extruded into a tube.
[4]The COC specimen was made from Topas 8007 resin and was injection molded into y-site with the bonding site in a tube geometry.

| Combination | Material-1 to Material-2 | Solvent | Bond Strength |
|---|---|---|---|
| Rigid to Flexible | Topas8007[a] to Engage 8003[b] | Cyclohexane | good |
| | | Ethyl cyclo hexane | good |
| | | Propyl cyclo hexane | good |
| | | n-Butyl cyclo hexane | good |
| | | t-Butyl cyclo hexane | good |
| | | Xylene | good |
| | | Tetralin | good |
| | | Decalin | good |
| | | Heptane | good |
| | | Cumene | good |
| | | Toluene | weak |
| | | Cyclohexanone | none |
| | | Methyl ethyl ketone | none |
| | | Methylene chloride | none |
| | | Tetrahydrofuran | none |
| | | Dimethyl formamide | none |
| | | Dimethyl sulfoxide | none |

-continued

| Combination | Material-1 to Material-2 | Solvent | Bond Strength |
|---|---|---|---|
| Rigid to Flexible | Topas8007[a] to Elvax CM576[b] | Cyclohexane | good |
| | | Ethyl cyclo hexane | good |
| | | Propyl cyclo hexane | good |
| | | n-Butyl cyclo hexane | good |
| | | t-Butyl cyclo hexane | good |
| | | Xylene | good |
| | | Tetralin | good |
| | | Decalin | good |
| | | Heptane | good |
| | | Cumene | good |
| | | Toluene | weak |
| | | Cyclohexanone | none |
| | | Methyl ethyl ketone | none |
| | | Methylene chloride | none |
| | | Tetrahydrofuran | none |
| | | Dimethyl formamide | none |
| | | Dimethyl sulfoxide | none |
| Rigid to Rigid | Topas 8007[c] to Topas 8007[c] | Cyclohexane | strong |
| | | n-Butyl cyclo hexane | strong |
| | | Xylene | strong |
| | | Tetralin | strong |
| | | Heptane | strong |

Note:
[a]Injection molded into y-site.
[b]Extruded tubing.
[c]Compression molded sheet.
Bond strength was assessed by hand pull test, at one day after the solvent bonding.
Ratings:
None = Readily separable.
Weak = Some bond strength but easy to separate.
Good = Hard to seperate, no material transfer is visible on the peeled surface but is suitable for providing a sterile, sturdy connection.
Strong = Very hard to separate, material transferring from one surface to another at the peeled bonding interface is visible.

V. Examples of cements made by dissolving the COC resin in solvents for bonding flexible polyolefin components:

The COC cements were prepared by dissolving the COC into a solvent at room temperature. Elevated temperature such as 50° C. can be used to enhance the speed of the preparation of the cement solution.

| Cement formulation | Composition | | |
|---|---|---|---|
| A | coc resin: | Topas 8007 | 1% wt |
| | solvent: | Cyclohexane | 99% wt |
| B | coc resin: | Topas 8007 | 5% wt |
| | solvent: | Cyclohexane | 95% wt |
| C | coc resin: | Topas 8007 | 15% wt |
| | solvent: | Cyclohexane | 85% wt |
| D | coc resin: | Topas 8007 | 5% wt |
| | solvent: | n-Butyl cyclohexane | 95% wt |
| E | coc resin: | Topas 8007 | 5% wt |
| | solvent: | Decalin | 95% wt |
| F | coc resin: | Topas 8007 | 5% wt |
| | solvent: | Heptane | 95% wt |
| G | coc resin: | Topas 5013 | 5% wt |
| | solvent: | Cyclohexane | 95% wt |
| H | coc resin: | Topas 5013 | 20% wt |
| | solvent: | Cyclohexane | 80% wt |

VI. Examples of bonding a flexible component to a flexible component using COC cement compositions of Example V.

Tubings made of ULDPE (Engage 8003) or EVA (Elvax CM 576) were extruded and cut into segments. Cement was applied between bonding interfaces of the tubing segments identified in the following table. The bonding was done by applying small amount of the cement at the bonding interface. Bond strength was measured by a hand pull test conducted one day after bonding.

| Flexible to flexible bonding | Cement | Bond Strength |
|---|---|---|
| Engage 8003 to Engage 8003 | A | good |
| Engage 8003 to Engage 8003 | B | good |
| Engage 8003 to Engage 8003 | C | weak |
| Engage 8003 to Engage 8003 | D | good |
| Engage 8003 to Engage 8003 | E | good |
| Engage 8003 to Engage 8003 | F | good |
| Elvax CM 576 to Elvax CM 576 | A | weak |
| Elvax CM 576 to Elvax CM 576 | B | good |
| Elvax CM 576 to Elvax CM 576 | C | good |
| Elvax CM 576 to Elvax CM 576 | D | good |
| Elvax CM 576 to Elvax CM 576 | E | good |
| Elvax CM 576 to Elvax CM 576 | F | good |
| Elvax CM 576 to Elvax CM 576 | G | good |
| Elvax CM 576 to Elvax CM 576 | H | good |

Ratings:
None = Readily separable.
Weak = Some bond strength but easy to separate.
Good = Hard to separate, no material transfer is visible on the peeled suface but is suitable for providing a sterile, sturdy connection.
Strong = Very hard to separate, material transferring from one surface to another at the peeled bonding interface is visible.

VII. COC Blends

Blends of the components set forth in the following table were prepared with a Brabender mixer at 250° C. at 50 rpm for 4 minutes.

Films were prepared by compression molding at 450° F. to a thickness about 0.4 mm.

The Haze property is useful for the end user to see through the medical device for the purpose of examining the liquid level, particulates, contamination, or the presence of drugs. Lower haze gives clearer view and higher haze gives a fuzzy view. Low haze is frequently a desirable property for medical devices such as solution containers, drug delivery devices, I.V. and blood sets, dialysis devices, and syringes.

The haze and total light transmittance of the film were measured using a ColorQuest instrument with both sides of the film wetted with isopropyl alcohol to remove the effect of surface roughness.

Example VII A: Blends of COC with styrenic copolymers and polypropylene.

| COC Blend Composition | Blend Ratio (wt %) | Light Transmittance (%) | Haze (%) |
|---|---|---|---|
| Topas 8007/ Rexflex W304 | 30/70 | 70 | 85 |
|  | 50/50 | 75 | 83 |
|  | 70/30 | 75 | 81 |
| Topas 8007/ Kraton G1657 | 30/70 | 64 | 86 |
|  | 50/50 | 82 | 80 |
|  | 70/30 | 84 | 80 |
| Topas 8007/K-Resin KR01 | 50/50 | 72 | 83 |
| Topas6015/ K-Resin KR01 | 50/50 | 58 | 86 |

Examples VII B–D: Blends of COC with polyethylene:

Summary:

The polymer blends that have lower haze, i.e. better clarity, are Topas 8007 blended with ethylene copolymers that have hexene comonomer polymerized with metallocene catalyst. The blends with the lowest haze are from the blends with polyethylene with hexene comonomer, polymerized with a metallocene catalyst and with a density of higher than 0.900 and more preferably higher than 0.93 (e.g. Marlex D350).

Example VII B:

Blends of Topas 8007 (Tg~80 deg C.) and polyethylene with different comonomers.

| COC Blend Composition | Blend Ratio | Comonomer in Polyethylene | Light Transmittance (%) | Haze (%) |
|---|---|---|---|---|
| Topas 8007/Tafmer A4085 | 30/70 | Butene | 84 | 80 |
|  | 50/50 |  | 89 | 70 |
|  | 70/30 |  | 81 | 61 |
| Topas 8007/Exact 3024 | 50/50 | Butene | 88 | 83 |
| Topas 8007/Exact 3128 | 50/50 | Butene | 88 | 77 |
| Topas 8007/Exact 4033 | 50/50 | Butene | 81 | 81 |
| Topas 8007/Exact 3131 | 50/50 | Hexene | 93 | 60 |
| Topas 8007/Exact 3030 | 50/50 | Hexene | 84 | 64 |
| Topas 8007/Marlex D143 | 30/70 | Hexene | 87 | 53 |
|  | 50/50 |  | 91 | 58 |
|  | 70/30 |  | 90 | 52 |
| Topas 8007/Marlex D350 | 20/80 | Hexene | 89 | 54 |
|  | 30/70 |  | 87 | 44 |
|  | 50/50 |  | 91 | 46 |
|  | 70/30 |  | 91 | 45 |
|  | 90/10 |  | 92 | 25 |
| Topas 8007/Affinity VP8770 | 50/50 | Octene | 85 | 72 |
| Topas 8007/Affinity PL 1880 | 50/50 | Octene | 90 | 77 |
| Topas 8007/Engage 8411 | 50/50 | Octene | 91 | 84 |

Example VII C:

Blends of Topas 6015 (Tg~160 deg C.) and polyethylene with different comonomers.

| COC Blend Composition | Blend Ratio | Comonomer in Polyethylene | Light Transmittance (%) | Haze (%) |
|---|---|---|---|---|
| Topas 6015/Tafmer TFB-01 | 30/70 | Butene | 65 | 84 |
|  | 50/50 |  | 78 | 85 |
|  | 70/30 |  | 47 | 85 |
| Topas 6015/Marlex D143 | 30/70 | Hexene | 76 | 85 |
|  | 50/50 |  | 83 | 83 |
|  | 70/30 |  | 77 | 79 |
| Topas 6015/Marlex D350 | 30/70 | Hexene | 54 | 81 |
|  | 5/50 |  | 80 | 72 |
|  | 70/30 |  | 79 | 76 |
| Topas 6015/Exact 3030 | 30/70 | Hexene | 86 | 84 |
|  | 50/50 |  | 82 | 84 |
|  | 70/30 |  | 62 | 83 |

Example VII D:

Blends of Topas 6017 (Tg~180 deg C.), Topas 8007 (Tg~80 deg C.) and polyethylene with different comonomers.

| COC Blend Composition | Blend Ratio | Comonomer in Polyethylene | Light Transmittance (%) | Haze (%) |
|---|---|---|---|---|
| Topas 6017/Topas 8007/Affinity VP8770 | 25/25/50 | Octene | 65 | 85 |
|  | 30/20/50 |  | 69 | 85 |
| Topas 60/17/ Topas 8007/Marlex D350 | 15/15/70 | Hexene | 91 | 69 |
|  | 25/25/50 |  | 82 | 75 |
|  | 35/35/30 |  | 89 | 42 |

Conclusion

The blend that has reduced haze contains Topas 8007 and a metallocene catalyst polymerized ethylene-hexene copolymer.

Example VII—blends with polybutadiene

Polybutadiene and COC polymers set forth in the table below were prepared as described in the above in Example VI. The haze values showed improvements over those obtained for COC/ULDPE ($C_6$) blends.

| COC Blend Composition | Blend Ratio (wt %) | Haze (%) | Elongation (%) |
|---|---|---|---|
| Topas 8007/JSR RB810 | 80/20 | 57 | 32 |
| Topas 8007/TSR RB820 | 90/10 | 32 | — |
| Topas 8007/TSR RB820 | 80/20 | 30 | 45 |
| Topas 8007/TSR RB820 | 20/80 | 66 | — |
| Topas 8007/TSR RB830 | 90/10 | 12 | — |
| Topas 8007/TSR RB830 | 80/20 | 24 | 29 |
| Topas 8007/TSR RB830 | 20/80 | 60 | — |

It should be understood that any ranges or sets of ranges set forth herein includes any and all ranges, combination or subcombination of ranges therein.

While specific embodiments have been illustrated and described, numerous modifications are possible without departing from the spirit of the invention, and the scope of protection is only limited by the scope of the accompanying claims.

What is claimed is:

1. A polymer composition comprising:
a first component selected from the group consisting of homopolymers of cyclic olefins, copolymers of cyclic olefins copolymerized with an α-olefin, homopolymers of bridged polycyclic hydrocarbons, and copolymers of bridged polycyclic hydrocarbons copolymerized with an α-olefin, the first component being present in an amount from about 30% to about 99% by weight of the composition; and
a second component is selected from homopolymers and copolymers of a diene having from 4 to 12 carbons, the second component being present in an amount from about 70% to about 1% by weight of the composition.

2. The composition of claim 1 wherein the first component is a homopolymer of a cyclic olefin.

3. The composition of claim 1 wherein the first component is a copolymer of a cyclic olefin copolymerized with an α-olefin.

4. The composition of claim 3 wherein the α-olefin has from 2 to 8 carbons.

5. The composition of claim 4 wherein the α-olefin is ethylene.

6. The composition of claim 1 wherein the first component is a homopolymer of a bridged polycyclic hydrocarbon.

7. The composition of claim 1 wherein the first component is a copolymer of a bridged polycyclic hydrocarbon copolymerized with an α-olefin.

8. The composition of claim 7 wherein the α-olefin has from 2 to 8 carbons.

9. The composition of claim 8 wherein the α-olefin is ethylene.

10. The composition of claim 6 wherein the bridged polycyclic hydrocarbon is norbornene.

11. The composition of claim 10 wherein the norbornene is present from about 30 mole percent to about 60 mole percent.

12. The composition of claim 3 wherein the glass transition temperature of the first component is from about 70° C. to about 130° C.

13. The composition of claim 1 wherein the diene has from 4 to 8 carbons.

14. The composition of claim 1 wherein the second component is a homopolymer of butadiene.

15. The composition of claim 14 wherein the second component is a 1,2 addition product of 1,3 butadiene.

16. The composition of claim 15 wherein the second component is a syndiotactic 1,2 addition product of 1,3 butadiene.

17. The composition of claim 16 wherein the second component is a low crystallinity, syndiotactic 1,2 addition product of 1,3 butadiene.

18. A polymer composition comprising:
a first component of a homopolymer of norbornene or copolymer of norbornene and in an amount by weight of from about 30% to about 99% of the composition; and
a second component is selected from homopolymers of a diene having from 4 to 12 carbons and copolymers of a diene having from 4 to 12 carbons, the second component being present in an amount from about 70% to about 1% by weight of the composition.

19. The composition of claim 18 wherein the second component is a homopolymer of butadiene.

20. The composition of claim 18 wherein the second component is a 1,2 addition product of 1,3 butadiene.

21. The composition of claim 20 wherein the second component is a syndiotactic 1,2 addition product of 1,3 butadiene.

22. The composition of claim 18 wherein the second component is a low crystallinity, syndiotactic 1,2 addition product of 1,3 butadiene.

23. A polymer composition comprising:
a first component of an ethylene and norbornene copolymer and in an amount by weight of from about 30% to about 99% by weight of the composition; and
a second component is selected from homopolymers and copolymers of a diene having from 4 to 12 carbons, the second component being present in an amount from about 70% to about 1% by weight of the composition.

24. The composition of claim 23 wherein the second component is a homopolymer of butadiene.

25. The composition of claim 23 wherein the second component is a 1,2 addition product of 1,3 butadiene.

26. The composition of claim 23 wherein the second component is a syndiotactic 1,2 addition product of 1,3 butadiene.

27. The composition of claim 23 the second component is a low crystallinity, syndiotactic 1,2 addition product of 1,3 butadiene.

28. A polymer composition comprising:
a first component of an ethylene and norbornene copolymer and in an amount by weight of from about 51% to about 99% by weight of the composition; and
a second component of a polybutadiene in an amount by weight of from about 49% to about 1%.

29. The composition of claim 28 wherein the second component is a homopolymer of butadiene.

30. The composition of claim 28 wherein the second component is a 1,2 addition product of 1,3 butadiene.

31. The composition of claim 28 wherein the second component is a syndiotactic 1,2 addition product of 1,3 butadiene.

32. The composition of claim 28 the second component is a low crystallinity, syndiotactic 1,2 addition product of 1,3 butadiene.

33. A polymer composition comprising:
a first component selected from the group consisting of homopolymers of cyclic olefins and homopolymers of bridged polycyclic hydrocarbons, the first component being present in an amount from about 1% to about 99% by weight of the composition; and
a second component is selected from the group consisting of homopolymers of a diene having 4 to 12 carbons and copolymers of a diene having from 4 to 12 carbons, the second component being present in an amount from about 99% to about 1% by weight of the composition.

34. The composition of claim 33 wherein the first component is a homopolymer of a bridged polycyclic hydrocarbon.

35. The composition of claim 34 wherein the bridged polycyclic hydrocarbon is norbornene.

36. The composition of claim 35 wherein the norbornene is present from about 30 mole percent to about 60 mole percent.

37. The composition of claim 33 wherein the diene has from 4 to 8 carbons.

38. The composition of claim 33 wherein the second component is a homopolymer of butadiene.

39. The composition of claim 38 wherein the second component is a 1,2 addition product of 1,3 butadiene.

40. The composition of claim 39 wherein the second component is a syndiotactic 1,2 addition product of 1,3 butadiene.

41. The composition of claim 40 wherein the second component is a low crystallinity, syndiotactic 1,2 addition product of 1,3 butadiene.

42. The composition of claim 33 wherein the first component is a homopolymer of a cyclic olefin.

43. A polymer composition comprising:
   a first component selected from the group consisting of homopolymers of cyclic olefins, copolymers of cyclic olefins copolymerized with an α-olefin, homopolymers of bridged polycyclic hydrocarbons, and copolymers of bridged polycyclic hydrocarbons copolymerized with an α-olefin, the first component being present in an amount from about 1% to about 99% by weight of the composition; and
   a second component is selected from homopolymers of a diene having from 4 to 12 carbons, the second component being present in an amount from about 99% to about 1% by weight of the composition.

44. The composition of claim 43 wherein the first component is a homopolymer of a cyclic olefin.

45. The composition of claim 43 wherein the first component is a copolymer of a cyclic olefin copolymerized with an α-olefin.

46. The composition of claim 45 wherein the α-olefin has from 2 to 8 carbons.

47. The composition of claim 46 wherein the α-olefin is ethylene.

48. The composition of claim 43 wherein the first component is a homopolymer of a bridged polycyclic hydrocarbon.

49. The composition of claim 43 wherein the first component is a copolymer of a bridged polycyclic hydrocarbon copolymerized with an α-olefin.

50. The composition of claim 49 wherein the α-olefin has from 2 to 8 carbons.

51. The composition of claim 50 wherein the α-olefin is ethylene.

52. The composition of claim 48 wherein the bridged polycyclic hydrocarbon is norbornene.

53. The composition of claim 52 wherein the norbornene is present from about 30 mole percent to about 60 mole percent.

54. The composition of claim 45 wherein the glass transition temperature of the first component is from about 70° C. to about 130° C.

55. The composition of claim 43 wherein the diene has from 4 to 8 carbons.

56. The composition of claim 43 wherein the second component is a homopolymer of butadiene.

57. The composition of claim 56 wherein the second component is a 1,2 addition product of 1,3 butadiene.

58. The composition of claim 57 wherein the second component is a syndiotactic 1,2 addition product of 1,3 butadiene.

59. The composition of claim 58 wherein the second component is a low crystallinity, syndiotactic 1,2 addition product of 1,3 butadiene.

* * * * *